United States Patent [19]
Komatsu et al.

[11] Patent Number: 5,841,929
[45] Date of Patent: Nov. 24, 1998

[54] LIGHT WAVELENGTH FILTERING CIRCUIT AND MANUFACTURING METHOD THEREOF

[75] Inventors: Keiro Komatsu; Masako Hayashi; Kiichi Hamamoto; Tatsuya Sasaki; Takeshi Takeuchi, all of Tokyo, Japan

[73] Assignee: NEC Corporation, Tokyo, Japan

[21] Appl. No.: 780,189

[22] Filed: Dec. 26, 1996

[30] Foreign Application Priority Data

Dec. 26, 1995 [JP] Japan ................................. 7-339154

[51] Int. Cl.$^6$ ....................................................... G02B 6/26
[52] U.S. Cl. ............................. 385/129; 385/32; 385/45; 385/14; 385/132; 385/147
[58] Field of Search ..................... 385/45, 129, 14, 385/132, 42, 24, 27, 48, 50, 32, 147

[56] References Cited

U.S. PATENT DOCUMENTS

| | | | |
|---|---|---|---|
| 5,226,100 | 7/1993 | Maerz ........................................ | 385/45 |
| 5,253,314 | 10/1993 | Alferness et al. ....................... | 385/40 |
| 5,333,219 | 7/1994 | Kuznetsov ................................ | 385/45 |

FOREIGN PATENT DOCUMENTS

| | | |
|---|---|---|
| 0 518 570 A2 | 12/1992 | European Pat. Off. . |
| 0 548 770 A2 | 6/1993 | European Pat. Off. . |
| 0 548 770 A3 | 6/1993 | European Pat. Off. . |
| 0 606 093 A2 | 7/1994 | European Pat. Off. . |
| 0 680 119 A1 | 11/1995 | European Pat. Off. . |
| 0 680 164 A2 | 11/1995 | European Pat. Off. . |
| 62-121409 | 6/1987 | Japan . |
| 5173033 | 7/1993 | Japan . |

OTHER PUBLICATIONS

Takato et al., "Silica–Based Integrated Optic Mach–Zehnder Multi/Demultiplexer Family with Channel Spacing of 0.01–250 nm", IEEE Journal on Selected Areas in Communications, vol. 8, Aug. 1, 1990, pp. 1120–1127.

J.C. Campbell et al., "Dual–Wavelength Demultipleing InGaAsP Photodiode", Appl. Phys. Lett. vol. 34 No. 6, Mar. 15, 1979, pp. 401–402.

K. Hamamoto et al., "Insertion–loss–free 2×2 InGaAsP/InP Optical Swithch Fabricated using Bandgap Energy controlled Selective MOVPE", Electronic Letters, vol. 31, Sep. 28, 1995, No. 20, Stevenage, Herts, GB, pp. 1781–1783.

T. Kato et al.; "DFB–LD/Modulator Integrated Light Source by Bandgap Energy Controlled Selective MOVPE"; Electronics Letters, vol. 28, No. 2, 16 Jan. 1992, pp. 153–154.

C. Dragone; "An N×N Optical Multiplexer Using a Planar Arrangement of Two Star Couplers"; IEEE Photonics Technology Letters, vol. 3, No. 9, Sep. 1991, pp. 812–815.

*Primary Examiner*—Hung N. Ngo
*Attorney, Agent, or Firm*—McGinn & Gibb, P.C.

[57] ABSTRACT

A light wavelength filtering circuit in a wavelength-division multiplexing light communication system minimizes transmission loss in the waveguide after wavelength discrimination by having a linear output waveguide added to an output end of a light wavelength discriminating element, at which a signal having a long wavelength is outputted. A curved output waveguide is added to the rear stage of the output end at which a signal having a relatively short wavelength is outputted. Hence, a radiation loss at the output waveguide at the output end is minimized, while a space between the output light waveguides is being widened. Additionally, a core layer bandgap wavelength at the output waveguide of the long wavelength signal is set to be longer than a core layer band gap wavelength in another region. Hence, a substantial light confinement is formed in a horizontal direction even in the output waveguide at the long wavelength signal side and even if the output waveguide at the long wavelength signal side is curved, and the radiation loss can be reduced.

14 Claims, 6 Drawing Sheets

LIGHT WAVELENGTH FILTERING CIRCUIT AND MANUFACTURING METHOD THEREOF

BACKGROUND OF THE INVENTION

The present invention generally relates to a light wavelength filtering circuit for a wavelength division multiplexing (WDM) light communication system, and more particularly to a light wavelength filtering circuit and manufacturing method thereof, in which a waveguide propagation loss after wavelength filtering is not dependent upon a transmitted light wavelength.

DESCRIPTION OF THE RELATED ART

Recently, a wavelength-division multiplexing transmission system has been used for expanding the transmission capacity of a light communication system. In a wavelength-division multiplexing light communication system, a light wavelength filtering circuit divides a transmitted wavelength multiplex signal in a spatial manner. Thus, the light wavelength discriminating element has been a basic element of the light wavelength filtering circuit.

For the light wavelength discriminating element, a directional coupler has been employed which utilizes the phenomenon that a coupling length is different for each wavelength.

Alternatively, a Mach-Zehnder-type light wavelength discriminating element has been employed which utilizes the phenomenon that an optical light path is made different for each wavelength even if the path length is kept constant. Finally, an element utilizing a waveguide grating and the like has been used.

Additionally, C. Dragone in IEEE PHOTONIC TECHNOLOGY LETTERS September, 1991 (Vol. 3, No. 9, pp. 812–815), discloses a light wavelength discriminating element in which two star couplers and an arrayed waveguide grating are combined together.

However, each of the above conventional light wavelength filtering circuits is disadvantageous in that a waveguide configuration, having its output light separated in a spatial manner after its wavelength is separated, has not been sufficiently studied.

Further, a signal at a long wavelength side is radiated, at an output waveguide bend 102a (see FIG. 11), with high loss. This problem is described in further detail below while referring to FIG. 11 which illustrates an exemplary directional coupler-type light wavelength discriminating element.

Figure 11:
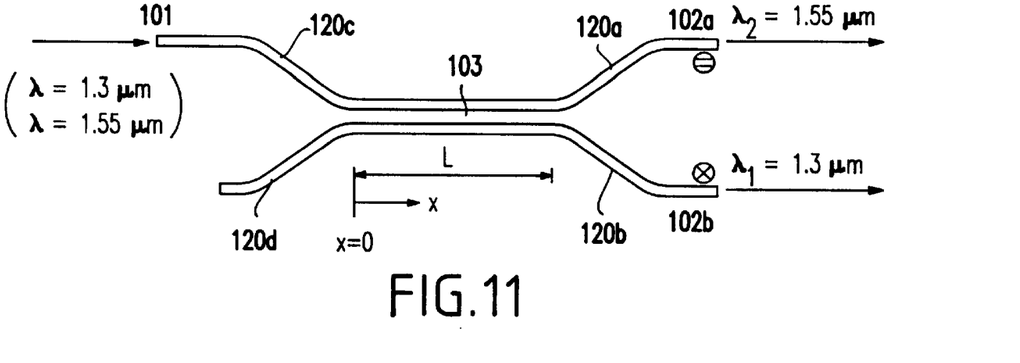
FIG. 11 illustrates a conventional directional coupler for use in illustrating an operating principle of the directional coupler-type light wavelength discriminating element.

In the directional coupler-type light wavelength discriminating element shown in FIG. 11, two linear light waveguides are arranged adjacent a length L and a light coupling is generated at this portion. If a coupling length $l_{01}$ (not illustrated in FIG. 11) is equal to the directional coupler length L, when light having a wavelength $\lambda_1$ equal to 1.3 $\mu$m is inputted from an incident light port 101, a transmission light wave is coupled to another waveguide and outputted from an output light port 102b. Generally, the coupling length is strongly dependent on wavelength. Thus, the longer the wavelength, the shorter the coupling length required.

To the contrary, light having a wavelength $\lambda_2$ (wherein $\lambda_2$=1.55 $\mu$m) is inputted from the incident light port 101. If a coupling length $l_{02}$ is one-half of a directional coupler length L, then the transmission light is coupled to the other waveguide. Thereafter, it is coupled again to the waveguide at the incident side and outputted from an output port 102a.

Figure 12A:
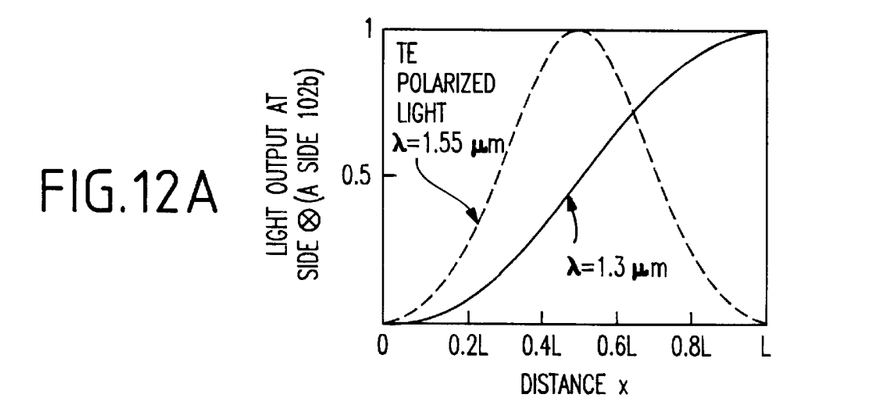
FIGS. 12(A) and 12(B) respectively illustrate the relationship between a distance of the waveguides in the directional coupler and a light output of the output waveguide, and the relationship between a radius of curvature of a waveguide bend and a radiation loss.

In this case, a relation of $\lambda_1<\lambda_2$ is generally attained, as shown for example in FIG. 12(a).

FIG. 12(a) illustrates one example in which $\lambda_1$=1.3 $\mu$m, $\lambda_2$=1.55 $\mu$m are applied and both of them are transverse electric (TE)- polarized light. As apparent from FIG. 12(a), if a coupling length can be accurately controlled to $l_{01}$=L, $l_{02}$=L/2, a wavelength separation may be performed having low crosstalk (e.g., little mixing of the shorter wavelength light with the longer wavelength light, after initial separation).

In this case, waveguide bends 120a and 120b are connected to the directional coupler 103 and comprise two adjoining linear waveguides. Although there is no radiation loss for the signal light having $\lambda_1$=1.3 $\mu$m, a high radiation loss may result at the waveguide bend for the signal light having $\lambda_2$=1.55 $\mu$m. This difference in radiation loss occurs in the conventional system because lateral light confinement for $\lambda_2$=1.55 $\mu$m signal light is poor. Specifically, optical confinement factors are different since the indices of refraction are different for the different wavelengths involved. Thus, there is a difference in radiation loss between $\lambda_1$=1.3 $\mu$m and for the signal light having $\lambda_2$=1.55 $\mu$m.

Figure 12B:
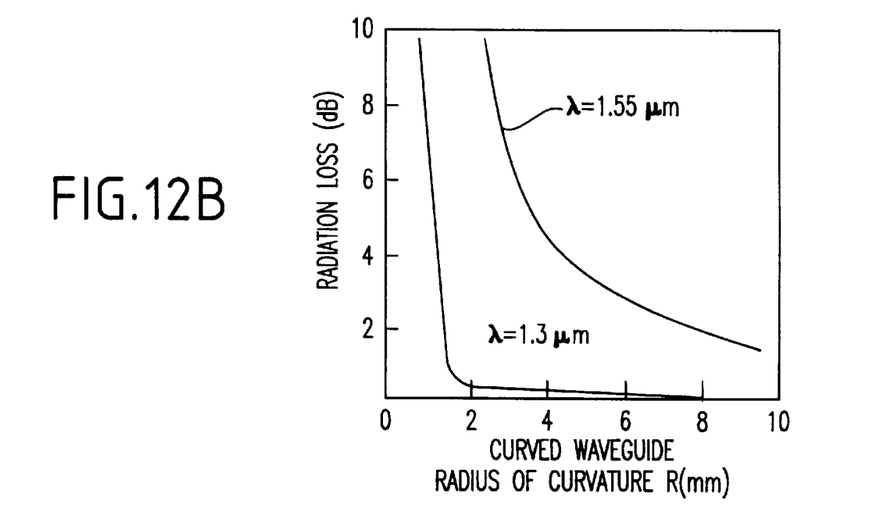

In FIG. 12(b), the radiation loss on a waveguide bend having a wavelength composition of the core layer of 1.15 $\mu$m is indicated for both transmission wavelengths of 1.3 $\mu$m, 1.5 $\mu$m, respectively.

In this case, the composition wavelength of the core layer is about 1.15 $\mu$m so that the waveguide has a low absorption loss for signals with $\lambda_1$ =1.3 $\mu$m and $\lambda_2$=1.55 $\mu$m. At the transmission light wavelength of 1.3 $\mu$m, a radius of curvature of at least 2 mm does not cause any radiation loss.

However, at the transmission light wavelength of 1.55 $\mu$m, even if the radius of curvature is 10 mm, a radiation loss is still generated. More specifically, at the core layer composition wavelength of 1.15 $\mu$m, a sufficient light confinement can be attained against a transmission light of 1.3 $\mu$m. However, a sufficient light confinement may not be provided for the transmission light of 1.55 $\mu$m. Thus, a high radiation loss at the waveguide bend for the light of 1.55 $\mu$m is produced.

Specifically, there is loss at 1.55 $\mu$m and no loss at 1.3 $\mu$m with a 2 mm radius curvature (e.g., higher radiation loss for longer wavelengths) because the lateral light confinement is poorer for the longer wavelengths. More specifically, the refractive index of the core layer is smaller for longer propagating wavelengths. Therefore, the refractive index difference between the core and the cladding is smaller for propagating light with longer wavelengths, which results in poorer light confinement in the lateral direction.

As described above, the conventional light wavelength filtering circuit incurs the problem that a longer wavelength signals have a higher loss when the output signal light is separated in a spatial manner.

Additionally, the conventional circuit requires stringent design requirements for the coupling length, otherwise crosstalk occurs in each of the output waveguides. For example, a 2–3 $\mu$m distance should be precisely provided between the coupler and the waveguide. If the distance is closer, then crosstalk will occur. Conversely, if the distance is more than 3 $\mu$m, then the circuit becomes large and bulky, and the coupling efficiency may be degraded.

Other examples of conventional systems are disclosed in Japanese Laid-Open Patent Publication No. 62-121409 and No. 5-173033.

Japanese '409 discloses a waveguide arrangement in which an optical signal having a wavelength $\lambda_3$ is input to an optical fiber, and an optical signal having wavelength $\lambda_1$ and $\lambda_2$ are propagated in the optical fiber. The $\lambda_3$ signal is input at a curved portion of the light waveguide, to reduce the crosstalk of the respective longer wavelength signal (e.g., the $\lambda_1$ and $\lambda_2$ inputs). A semiconductor element 12 has an active waveguide layer made of a first semiconductor material which absorbs the optical signals having wavelengths $\lambda_2$ and $\lambda_3$, and passes $\lambda_1$, and a second semiconductor material which absorbs the optical signal having $\lambda_3$, and passes the signal having $\lambda_2$. However, there is no discussion or disclosure of radiation loss at a curvature portion of the waveguide.

Japanese '033, which discloses a 3-input cascaded configuration, is similar to Japanese '409, but has similar problems with regard to lack of disclosure (and recognition of a problem) of radiation loss at a curvature portion of the light waveguide.

SUMMARY OF THE INVENTION

In view of the foregoing problems of the conventional devices, it is an object of the present invention to provide a light wavelength filtering circuit having substantially no radiation loss in a signal at a long wavelength side when an output signal is separated spatially after wavelength separation is performed by a light wavelength discriminating element.

Another object is to provide a method for manufacturing a convenient light wavelength filtering circuit having a superior manufacturing yield with respect to a method for monolithic integration of the waveguide having a different composition so as to reduce a radiation loss of the long wavelength side signal.

To solve the problems of the conventional devices, a light wavelength filtering circuit according to a first aspect of the present invention includes an input light waveguide to which a wavelength-multiplexed light signal is incident; a light wavelength discriminating element connected to the input light waveguide and for separating the wavelength-multiplexed signal light for every wavelength; and a plurality of output light waveguides connected to the light wavelength discriminating element so as to separate spatially each of the wavelength signal lights separated by the light wavelength discriminating element.

The output light waveguide of the output light waveguides for use in outputting a long wavelength signal light includes a linear light waveguide and an output waveguide for use in outputting a short wavelength signal light includes a curved light waveguide.

Further, according to a second aspect of the present invention, a light wavelength filtering circuit includes an input light waveguide to which a wavelength-multiplexed light signal is incident; a light wavelength discriminating element connected to the input light waveguide and for separating the wavelength-multiplexed signal light for every wavelength; and a plurality of output light waveguides connected to the light wavelength discriminating element so as to separate spatially each of the wavelength signal lights separated by the light wavelength discriminating element.

A bandgap wavelength of a core layer in the output light waveguide for outputting a long wavelength side light signal of the output light waveguides has a longer wavelength than a core layer bandgap wavelength of another output light waveguide or an input light waveguide or a light waveguide of the light wavelength discriminating element.

According to a third aspect of the present invention, a method of manufacturing a light wavelength filtering circuit is provided, which includes steps of forming a selective growth dielectric mask having a gap pattern corresponding to core layer patterns in an input light waveguide, a waveguide-type light wavelength discriminating element and an output light waveguide on a semiconductor substrate; stacking a semiconductor buffer layer, a semiconductor core layer and a semiconductor cladding layer in sequence on the gap of the mask to form mesa stripes containing the semiconductor core layer in total with the input light waveguide, the waveguide-type light wavelength discriminating element and the output light waveguide; widening a width of the gap of the selective growth dielectric mask; stacking a semiconductor embedding layer on the widened gap and on the mesa stripes containing the semiconductor core layer; and removing the dielectric mask.

A width of the dielectric mask of the output light waveguide for use in outputting the long wavelength side signal light in the output light waveguide is wider than a width of the dielectric mask in another region.

With the unique and unobvious structure and method of the invention, a light wavelength filtering circuit is produced having substantially no radiation loss in a signal at a long wavelength side when an output signal is separated spatially after wavelength separation is performed by a light wavelength discriminating element. Further, the method provides a superior manufacturing yield with respect to monolithic integration of the waveguide having a different composition so as to reduce a radiation loss of the long wavelength side signal.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
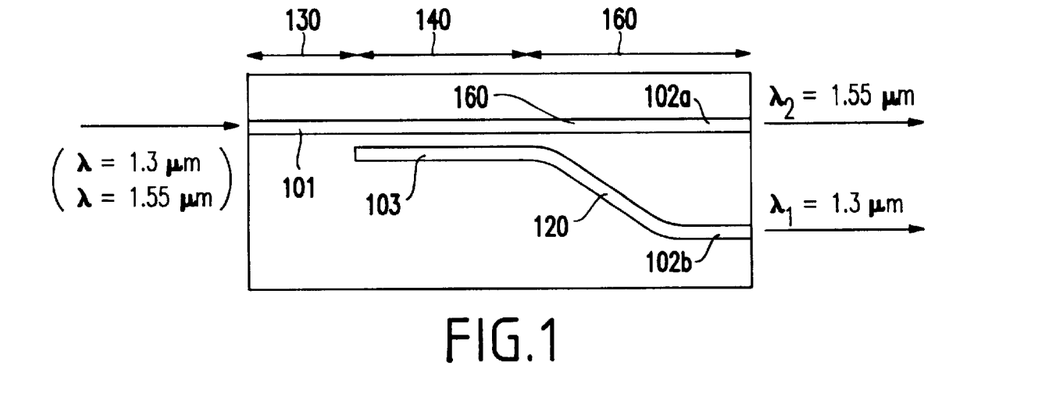
FIG. 1 illustrates a semiconductor light wavelength filtering circuit for use with a directional coupler-type light wavelength discriminating element according to a first preferred embodiment of the present invention.

Referring now to the drawings, and more particularly to FIG. 1, there is shown a first preferred embodiment of a semiconductor light wavelength filtering circuit according to the present invention.

The exemplary semiconductor light wavelength filtering circuit of FIG. 1 preferably has as its basic element an InP system directional coupler-type light wavelength discriminating element 103. The element 103 is for dividing and outputting the input wavelength-multiplexed signal inputted to input waveguide 101 to provide first and second outputs based on their wavelength.

In the semiconductor light wavelength filtering circuit, an output waveguide 102a is substantially linear (non-curved and planar to the direction of the input wavelength multiplex signal) at a side (hereafter termed a "long wavelength side") where a signal having a relatively long wavelength, is outputted at a rear stage of light wavelength discriminating element 103. For example, the long wavelength signal may have a wavelength of $\lambda_2=1.55$ μm. Thus, the output waveguide 102a is substantially straight and planar with the direction of the signal inputted to the light waveguide.

In turn, an output waveguide 120 is formed at a rear stage of a relatively "short wavelength side" (e.g., $\lambda_1=1.3$ μm). Output waveguide 120 includes a curved waveguide portion as in the conventional device. Specifically, the waveguide 120 includes a curved waveguide portion which is coupled between a first linear portion and a second linear portion. The first linear portion is adjacent the directional coupler 103 and substantially parallel to a portion of waveguide 101, and the second linear portion (e.g., 102b) is at the light output end and also is substantially parallel to the light output waveguide 102a.

Further, at the light output end, the long wavelength signal side output end 102a and a short wavelength side output end 102b are arranged in a sufficient spaced-apart distance (e.g., 125 μm).

Preferably, the waveguides are formed to have an embedding (cladding) layer and a core layer, the waveguides being positioned on a substrate. The exemplary cladding layer is formed of InP. However, other materials such as InAlAs may be used for the cladding layer in lieu of InP. Further, InGaAs can be used for the core layer. The range of refractive indices for the core ($n_0$) is preferably 3.3 to 3.5, whereas the range of refractive indices for the cladding ($n_1$) is 3.2 to 3.3.

Input and output light waveguides 130 and 150 preferably have a core width of 1.5 μm and a total width of 5 μm. As mentioned above, the mid-portion (e.g., linear portion) of the input light waveguide 101 and the first portion (e.g., linear portion) of the curved output light waveguide 120 are preferably separated by a distance of 1.5–5 μm. The direction coupler 102 is formed by (between) the overlapping portions of waveguides 101 and 120.

Preferably, the radius of curvature of the curved output light waveguide 120 is based upon tradeoffs made by the designer between the curvature radius in relation to the relative radiation loss (dB), as shown in FIG. 12(b). Typically, the curvature radius will be within a range of 2–10 mm.

Hereinbelow, the operation of the semiconductor light wavelength filtering circuit according to the first embodiment shown in FIG. 1 will be described.

First, it is assumed that signals having $\lambda_1$ (e.g., 1.3 μm) and $\lambda_2$ (e.g., 1.55 μm) are multiplexed and incident to the input light waveguide 101.

If a coupling length $l_1$ with respect to the wavelength 1.3 μm is equal to a length L of the directional coupler 103 (e.g., $l_1=L$) and a coupling length $l_2$ with respect to the wavelength 1.55 μm is one-half of L (e.g., $l_2=L/2$), the signal having a wavelength of 1.3 μm is outputted at the curved output light waveguide 120 by the light wavelength discriminating element 103.

Further, the signal light having a wavelength of 1.55 μm is outputted at the linear output light waveguide 160 by the directional coupler-type light wavelength discriminating element 103. In this case, the composition wavelength in the core layer is 1.15 μm in all regions, and low absorption loss is shown for both the light signals having the 1.3 μm wavelength and the 1.55 μm wavelength, respectively. For example, the absorption loss may be within the range of approximately 0.2 dB/mm.

Further, the waveguide 160 has a linear shape at an output side of the long wavelength signal.

With the above arrangement, even if the composition wavelength of the core layer is 1.15 μm (and the lateral confinement of the 1.55 μm wavelength is weak), there is substantially no radiation loss at the output waveguide. Briefly, this structure has a low loss at the 1.55 μm wavelength, in contrast to the conventional structure FIG. 11 has a high loss at the 1.55 μm wavelength, because in the configuration shown in FIG. 1, the output waveguide for the longer wavelength is made straight instead of curved as in the conventional configuration. Therefore, no radiation loss occurs for longer wavelength (e..g, 1.55 μm), even though the lateral confinement is weak. The conventional arrangement uses both a curved waveguide portion and a straight waveguide portion to minimize loss at both areas. If the optical confinement is poor, radiation loss will occur at the curved portion for the longer wavelength.

Additionally, a radius of curvature of the curved output light waveguide 120 at an output side of the short wavelength signal is maintained in such a low state (e.g., 2–4 mm curvature radius) that radiation loss occurs with respect to the long wavelength signal light (e.g., the 1.55 μm signal light), but no radiation loss occurs with respect to the short wavelength signal light (e.g., the 1.3 μm light signal).

For example, when the radiation loss characteristic is as shown in FIG. 12(b), a radius of curvature of the curved output light waveguide (e.g., at an output side of the short wavelength signal) is approximately 3 mm. With the above arrangement, crosstalk is reduced from the short wavelength side 102b through radiation. The "radiation" reduces the crosstalk through the waveguide walls due to insufficient internal reflection.

As mentioned above, the incident (input) light waveguide 101 also has a linear (e.g., non-curved) shape. Although a long wavelength light signal is also necessarily incident to the incident light waveguide 101, the incident light waveguide is formed to be linear, so as to prevent radiation loss at the incident side.

As described above, the first preferred embodiment has an output light waveguide 150, which is formed to have a linear shape at an output side of a relatively long wavelength signal. Thus, the problem of the conventional arrangement (e.g., radiation loss in the relatively long wavelength signal in the output light at the directional coupler-type light wavelength discriminating element which is radiated in the curved waveguide) is minimized (or prevented) by modifying the circuit configuration, as described above.

Additionally, an input of the long wavelength signal into the short wavelength side output light waveguide (and thus crosstalk) is also prevented.

Accordingly, with the present invention, a semiconductor light wavelength filtering circuit is produced, in which a waveguide transmission loss does not depend on the transmission light wavelength, and in which a low cross-talk characteristic is achieved by a convenient manufacturing method having a superior manufacturing yield.

Moreover, as shown in FIG. 1, the output waveguide is substantially linear at an output side of a relatively long wavelength signal. Only the output waveguide at an output side of a relatively short wavelength signal is curved, thereby to separate the light signal, the wavelength of which is separated in a spatial manner. With such an arrangement, the problem of the conventional arrangements is minimized and specifically that the relatively long wavelength signal at the output side is radiated at the curved waveguide to increase the radiation loss.

Second Embodiment

Turning to FIGS. 2–6, a second preferred embodiment of the semiconductor light wavelength filtering circuit according to the present invention is illustrated. For brevity, elements which are common to the first preferred embodiment and which have similar features will not be discussed in detail.

Figure 2:
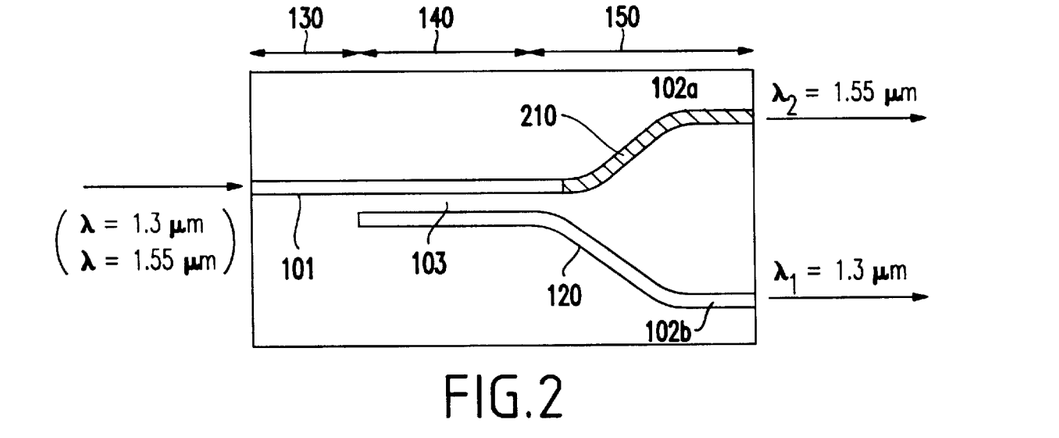
FIG. 2 illustrates a semiconductor light wavelength filtering circuit for use with the directional coupler-type light wavelength discriminating element according to a second preferred embodiment of the present invention.

As clearly shown in FIG. 2, the second preferred embodiment differs from the first preferred embodiment, by both the output light waveguides 210, 120 at the rear (output) stage of the light wavelength discriminating element 103 being curved waveguides.

In the second preferred embodiment, a waveguide 210 having a core layer with a longer bandgap wavelength of 1.3 $\mu$m is connected to a rear stage of the directional coupler 103. More particularly, the waveguide 210 having the core layer with the longer bandgap wavelength of 1.3 $\mu$m is connected to an output side for a relatively long wavelength signal (e.g., 1.55 $\mu$m).

That is, at any of the input light waveguide 101, the light waveguide of the directional coupler 103 and the output light waveguide 120 where a relatively short wavelength signal (e.g., 1.3 $\mu$m) is outputted, a composition wavelength of the core layer is 1.15 $\mu$m.

In contrast, the composition wavelength of the core layer of 1.3 $\mu$m is set to be longer than that of another region only in the output waveguide 210 at an output side of a relatively long wavelength signal (e.g., 1.55 $\mu$m).

Hereinbelow, the operation of the semiconductor light wavelength filtering circuit according to the second preferred embodiment of the present invention will be described.

First, it is assumed that signals having wavelengths of $\lambda_1$ (=1.3 $\mu$m) and $\lambda_2$ (=1.55 $\mu$m) are multiplexed and incident to the input light waveguide 101.

At this time, if a coupling length $l_1$ with respect to the wavelength of 1.3 $\mu$m is equal to L ($l_1$=L) and a coupling length $l_2$ with respect to the wavelength of 1.55 $\mu$m is one-half that of L ($l_2$=L/2), the light signal having a wavelength of 1.3 $\mu$m is outputted to the curved output light waveguide 120 by the directional coupler-type light wavelength discriminating element 103. The light signal having a wavelength of 1.55 $\mu$m is outputted to the light waveguide 210 by element 103.

Additionally, the bandgap wavelength of the core layer is 1.15 $\mu$m at all regions except for the light waveguide 210 with $\lambda g$=1.3 $\mu$m, and shows a low absorption loss for all of the light signals having wavelengths of 1.3 $\mu$m and 1.55 $\mu$m, respectively.

In the semiconductor light wavelength filtering circuit of the second preferred embodiment of the present invention, as shown in FIG. 2, the core layer bandgap wavelength of the waveguide 210 to which the long wavelength signal is input, is set to be as long as 1.3 $\mu$m. With such an arrangement, optical light confinement (e.g., in a lateral direction) of the transmission light with a wavelength of 1.55 $\mu$m is maintained, and no radiation loss occurs at the output waveguide. Hence, optical confinement is maintained by changing the core layer bandgap wavelength, and radiation loss is reduced and $\lambda g$ is increased only in region 210 and not in other areas. More specifically, the optical confinement is maintained due to the higher refractive index of the core layer for the 1.55 $\mu$m propagating light by the core layer bandgap wavelength of 1.3 $\mu$m instead of 1.15 $\mu$m, which results in a higher lateral confinement and reduced radiation loss.

Accordingly, in contrast to the structure of the first preferred embodiment shown in FIG. 1, with the second embodiment of the present invention, even if the waveguide is curved (e.g., formed to have a bent shape which is non-parallel to the planar direction of the input light signal) at an output side of the long wavelength signal, radiation loss is minimized.

In this case, in the input light waveguide 101 and the directional coupler 103, since both the relatively long wavelength light signal and the relatively short wavelength light signal are transmitted, the bandgap wavelength in the core layer must be a short wavelength (e.g., shorter than either the relatively long and relatively short wavelength signals) such that the short wavelength light signal does not suffer absorption loss.

For example, the core layer bandgap wavelength at the incident light waveguide 101 and the directional coupler 103 is preferably set to be substantially 1.15 $\mu$m, so as not to generate any absorption loss for the light signal having a wavelength of substantially 1.3 $\mu$m at the short wavelength output side.

In turn, the light signal is transmitted to each of the output waveguides. Accordingly, at the output light waveguide where the long wavelength light signal is transmitted (e.g., the light waveguide 210 with $\lambda g$ =1.3 $\mu$m), the short wavelength light signal is unwanted, and thus it is unnecessary to transmit this short wavelength light signal with the low absorption loss.

Accordingly, even if the bandgap wavelength in the output light waveguide at a side where the long wavelength light signal is transmitted is set to have a relatively long wavelength to maintain light confinement and to prevent/minimize radiation loss, no problem occurs so long as the bandgap wavelength does not generate any increase in absorption loss for the long wavelength light signal.

Further, when a radius of curvature of the curved output light waveguide 120, at a side where the short wavelength signal is outputted, is set to have a low value (e.g., a radius of 2–4 mm) such that radiation loss may occur for the long wavelength signal light (1.55 µm light signal), but such that no radiation loss occurs against the short wavelength signal light (e.g., the 1.3 µm light signal), a crosstalk component (e.g., a relatively long wavelength signal component) for a side where the short wavelength signal is outputted (an output end 102b), is removed during radiation. Thus, the crosstalk is reduced in the same manner as that of the first preferred embodiment.

Additionally, the second preferred embodiment is unlike the first preferred embodiment in that the crosstalk component (e.g., a relatively short wavelength signal component) for a side where the long wavelength signal is outputted (output end 102a) is also removed by absorption, thereby reducing the crosstalk.

That is, in the second preferred embodiment, the core layer bandgap wavelength in the waveguide where a signal of the long wavelength is outputted is set to be 1.3 µm in which the transmission light of 1.55 µm suffers no absorption but a low transmission loss may occur. Conversely, the 1.3 µm transmission light may suffer a large absorption loss. Accordingly, the short wavelength crosstalk component for the output side of the long wavelength signal (output end 102a) is removed through absorption, and the crosstalk is reduced.

Additionally, in the second preferred embodiment the incident light waveguide 101 also is linear similarly to that of the first preferred embodiment. Although the light signal at the relatively long wavelength is necessarily incident to the incident light waveguide, the incident light waveguide also is linear to prevent (or at least minimize) radiation loss at the incident side.

Hence, as shown in FIG. 2, a bandgap wavelength of the output light waveguide at the rear stage of the light wavelength discriminating element is changed according to the transmission light wavelength.

That is, a bandgap wavelength of the long wavelength output waveguide is elongated, and then a light confinement property of the long wavelength light signal can be made sufficiently high to prevent radiation loss.

With such an arrangement as above, even for a signal having a relatively long wavelength, radiation loss at the curved waveguide is restricted (e.g., minimized), and thus a curved waveguide can be utilized as a method for separating the output waveguide in a spatial manner.

Further, as shown in FIG. 2, waveguides having different bandgap wavelengths can be formed on the same wafer. Such a feature is difficult to achieve in the conventional manufacturing method. Thus, the present invention also provides a manufacturing method for easily realizing waveguide structures having partially different bandgap wavelengths.

More practically, in the present invention, a waveguide structure having partially different bandgap wavelengths is completely formed with one crystal growth, since the wavelength bandgap in the growth layer can be controlled with reference to a mask width by performing a selective crystal growth at the gap between a pair of dielectric mask strips. This feature is described in further detail by the present inventors in ELECTRONICS LETTERS Vol. 28, No. 2 (Jan. 16, 1992), pp. 153–154, incorporated herein by reference.

As discussed below in more detail, the conventional method requires multiple repetitive etching and crystal growth steps to form waveguides with different bandgap wavelengths. In contrast, as discussed below, the present invention forms waveguides having different bandgap wavelengths in a single growth process.

Figure 3:
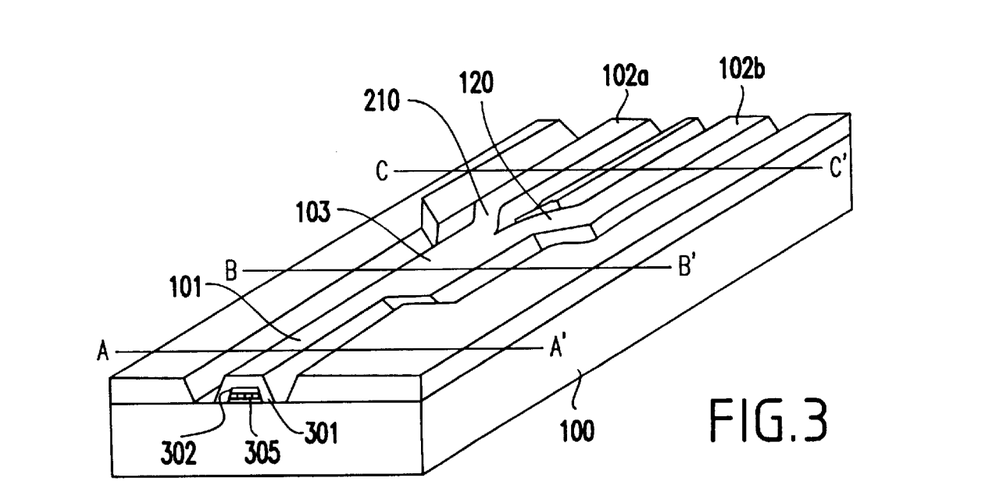
FIG. 3 is a perspective view for showing a structure of the semiconductor light wavelength filtering circuit according to the second preferred embodiment of the present invention.

FIG. 3 illustrates a perspective view of a configuration of the semiconductor light wavelength filtering circuit schematically shown in FIG. 2.

In fabricating the circuit, first a core layer 305 is formed. The core layer is preferably formed of bulk InGaAsP, having a preferred thickness within a range of 0.1 to 0.5 µm. Preferably, the core has a thickness closer to the greater end of the range since a thicker core layer is preferably for optical confinement properties. However, the core layer should not be too thick (greater than 0.5 µm), otherwise a multi-mode light results, whereas a single mode light is preferably desired.

Thereafter, a double hereto mesa 302, formed of two InP outer cladding layers and having the core layer 305 held therebetween, is formed on a substrate 100. As mentioned above, the cladding layers may be formed of InAlAs in lieu of InP, and the core layer may be formed of a number of materials but is advantageously formed of InGaAs or the like. The substrate 100 is preferably formed of InP and preferably has a thickness within a range of 100 to 200 µm. The double hetero mesa preferably has a thickness of 0.60 µm to 0.7 µm.

Then, the double hetero mesa 302 is embedded preferably in an InP embedding layer 301 to form the light waveguide. As shown in FIG. 3, the waveguide has a polygonal cross-sectional shape.

Figure 5A:
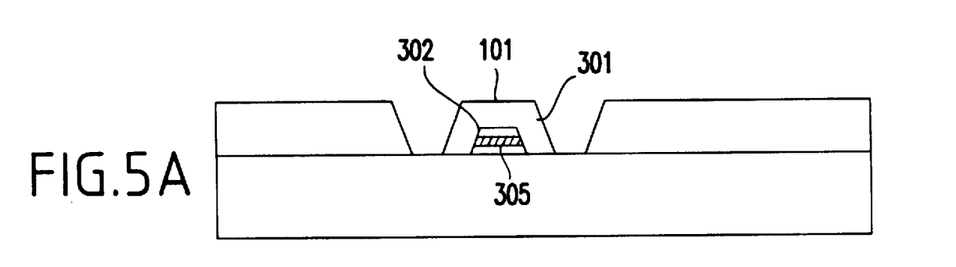
FIGS. 5(A)–5(C) are sectional views of the semiconductor light wavelength filtering circuit having the directional coupler-type light wavelength discriminating element of the second preferred embodiment shown in FIG. 1.
Figure 5B:
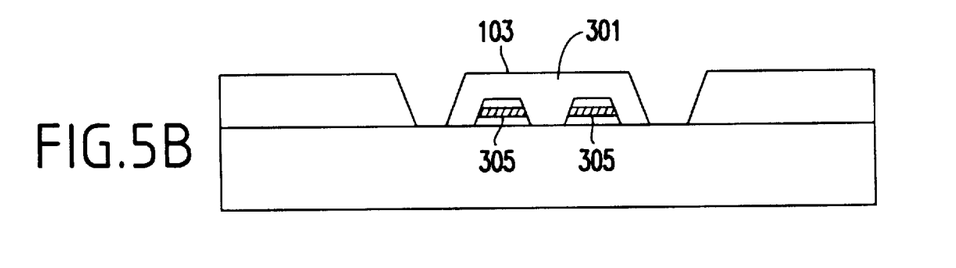
Figure 5C:
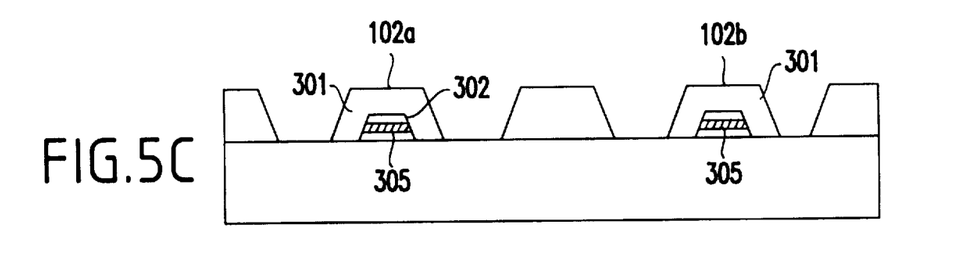

Although the input light waveguide 101 is formed by one waveguide (e.g., see FIG. 5(A) which illustrates a sectional view of the semiconductor light wavelength filtering circuit of FIG. 3 along line A–A'), two waveguides are closely arranged in the directional coupler 103 until an optical coupling is generated (e.g., see FIG. 5(B) which illustrates a sectional view of the semiconductor light wavelength filtering circuit of FIG. 3 along line B–B'). As shown in FIG. 3, an output from the directional coupler 103 has two independent waveguides. As mentioned above, the waveguides 305, 305 shown in FIG. 5(B) of the directional coupler 103 are preferably separated by a distance within a range of 1.5 to 5 µm Here, a shorter directional coupler can be achieved by a smaller waveguide distance, although control of the coupling length becomes more difficult.

In this case, a wavelength bandgap in the core layer 305 is preferably set to 1.15 µm such that the input light waveguide 101 and the light waveguide of the directional coupler 103 are transparent to both incident light wavelengths $\lambda_1$ (=1.3 µm) and $\lambda_2$ (=1.55 µm).

The rear (output) stage of the directional coupler 103 is formed such that the core layer bandgap wavelength in the output light waveguide 120 where a signal having the relatively short wavelength is outputted is similarly 1.15 µm, and then the output side for the relatively long wavelength signal (e.g., the side of the light waveguide 210 with $\lambda g$=1.3 µm) is formed with the core layer by bulk InGaAsP having a bandgap wavelength of 1.3 µm.

Hence, the bandgap wavelength of the output light waveguide at an output side of a relatively long wavelength signal is set to 1.3 µm. Thus, as described above, the radiation loss with respect to the long wavelength signal light may be reduced.

Referring now to FIGS. 4, 6(A)–6(D), and 7(A)–7(D), a method for manufacturing the light wavelength filtering circuit of the second preferred embodiment shown in FIGS. 2 and 3 will be described. FIGS. 6(A)–6(D) are sectional views taken along a line B–B' of FIG. 3, and in turn in FIGS. 7(A)–7(D) are sectional views taken along a line C–C' of FIG. 3. That is, the cross-sectional structures of the directional coupler 103 are shown in FIGS. 6(A)–6(D), respectively, and the cross-sectional structures of the light waveguide 210 and the output light waveguide 120 with λg=1.3 μm are shown at FIGS. 7(A)–7(D), respectively.

Figure 4:
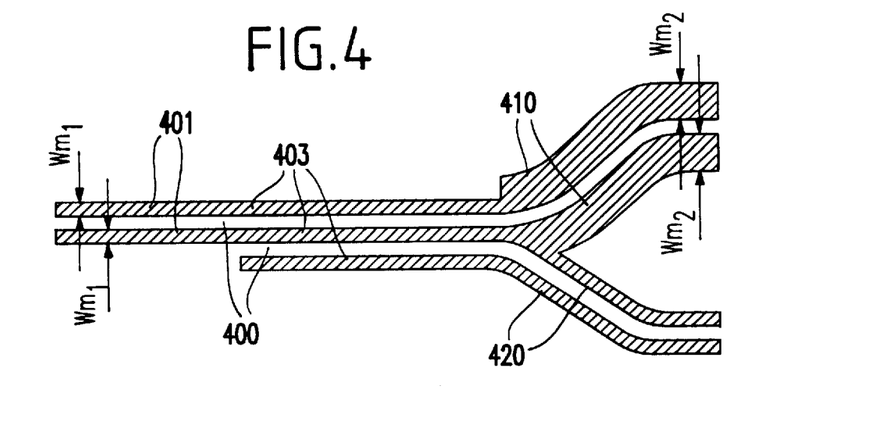
FIG. 4 is a top plan view for showing a shape of a selective growth mask when the semiconductor light wavelength filtering circuit having the directional coupler-type light wavelength discriminating element of the second preferred embodiment shown in FIG. 3.
Figure 6A:
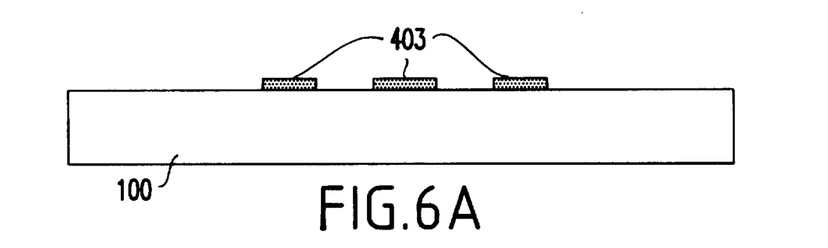
FIGS. 6(A)–6(D) are sectional views illustrating steps for manufacturing the semiconductor light wavelength filtering circuit having the directional coupler-type light wavelength discriminating element of the second preferred embodiment according to the present invention.

First, as shown in FIG. 6(A), a silicon oxide (e.g., $SiO_2$, silicon nitride, etc.) mask 403 for performing a selective growth is formed on, for example, an ([100]) n-iP substrate 100 having a substantially planar surface. The substrate 100 may have a thickness of 100 μm after polishing. The pattern figure of the mask (hereafter assumed to be a $SiO_2$ mask) shown in FIG. 4 is illustrated as a shape viewed from above the wafer. In FIG. 4, a portion indicated by hatching corresponds to a portion where the striped $SiO_2$ mask 403 is left after patterning.

Figure 6B:
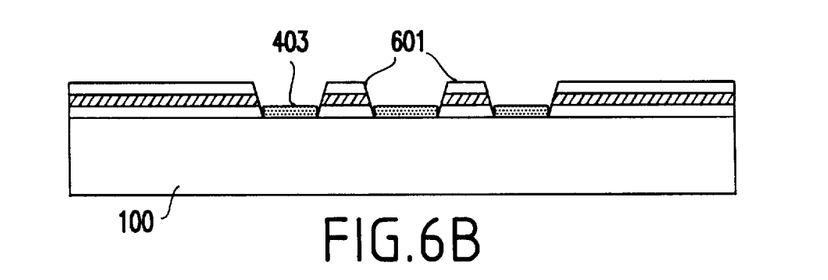

As shown in FIG. 6(B), a semiconductor mesa 601 containing the core layer is crystalline-grown at a gap 400 held by a pair of $SiO_2$ striped masks. A direction of the $SiO_2$ mask pattern 403 is selected such that a longitudinal direction of the stripe is the same as a direction of travel of incident light through the waveguide (e.g., preferably in the [011] direction).

Figure 7A:
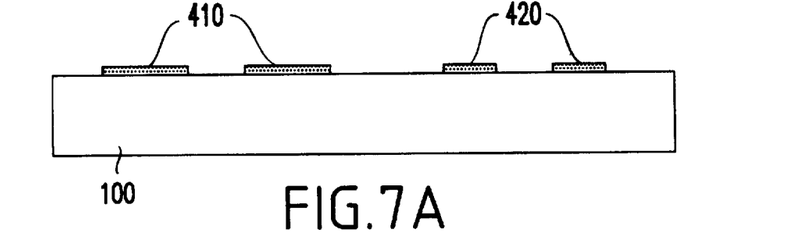
FIGS. 7(A)–7(D) are sectional views illustrating steps for manufacturing steps the semiconductor light wavelength filtering circuit having the directional coupler-type light wavelength discriminating element of the second preferred embodiment according to the present invention.

FIGS. 6(A) and 7(A) illustrate cross-sectional shapes of the wafer after the $SiO_2$ pattern shown in FIG. 4 is formed. As apparent from FIG. 4, a width of the relatively long wavelength output light waveguide $SiO_2$ mask 410 is preferably wider than that of the directional coupler $SiO_2$ mask 403 or the short wavelength output light waveguide $SiO_2$ mask 420. The mask width at portions other than the light waveguide 210 of λg=1.3 μm is preferably 5 μm. The mask width of the light waveguide 210 with λg=1.3 μm is preferably 30 μm.

Additionally, the width of the gap held by a pair of striped $SiO_2$ masks is preferably 1.5 μm at any regions. Further, a length of the input light waveguide 101 in FIG. 3 is preferably 500 μm, a length of each of the output light waveguides 102a, 102b is preferably 700 μm, a spacing between two waveguides in the output light waveguides 102a, 102b is preferably 250 μm, a length of a part where the waveguide of the directional coupler 103 is closely arranged is preferably 1000 μm, and a radius of curvature of a curved waveguide connecting the output light waveguides 102a, 102b of the directional coupler 103 is preferably between 2–10 mm, and more preferably between 2–4 mm, and even more preferably approximately 3 mm.

Figure 7B:
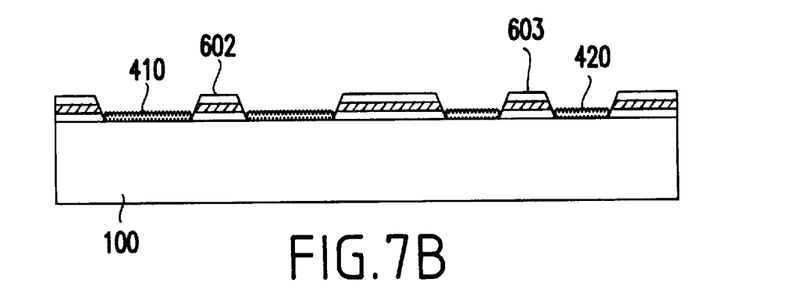

Then, as shown in FIG. 6(B) and FIG. 7(B), with the $SiO_2$ pattern shown in FIG. 4 being applied as a selective growth mask, double hetero mesas 601, 602 and 603 containing, for example, the InGaAsP core layer, are totally formed at the gap of the silicon oxide (e.g., $SiO_2$, silicon nitride, etc.) mask by a selective growth of MOVPE.

More specifically, the InP buffer layer is deposited on the substrate 100 to have a thickness of 2000 Å, the InGaAsP core layer is deposited on the InP buffer layer and has a thickness of 4000 Å and the InP cladding layer is deposited on the InGaAsP core layer to have a thickness of 2000 Å.

Additionally, a thickness of each of the aforesaid layers is a predetermined (e.g., set) value at the light waveguide 210 with λg=1.3 μm having a wide mask width and the thickness of the core layer in another region having a narrower mask width is decreased to about 2000 Å. At this time, if the crystal growth condition is set such that a bandgap wavelength of the core layer at the light waveguide 210 with λg=1.3 μm having a large width of selective growth mask of 30 μm may become approximately 1.30 μm, the bandgap wavelength at the core layer in another region having a relatively narrow mask width of 5 μm may become about 1.15 μm.

Thus, the region having a different bandgap is formed through one crystal growth by selective MOVPE growth.

Figure 6C:
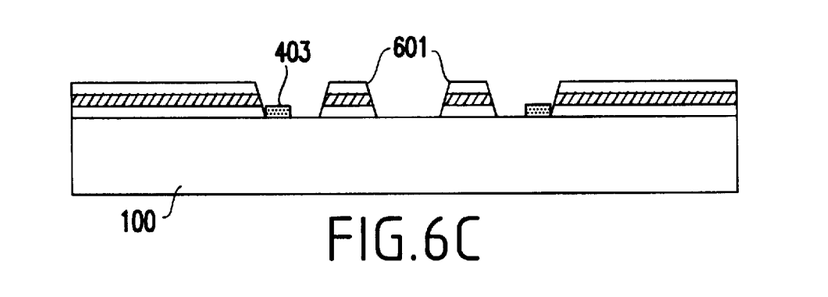
Figure 7C:
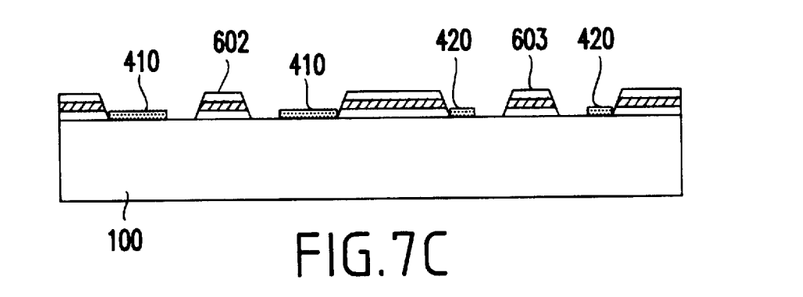

As shown in FIGS. 6(C) and 7(C), after the double hetero mesas 601 are totally formed in each of the regions through the selective MOVPE growth, the $SiO_2$ mask at the side of the double hetero mesas is removed by etching every 2 μm (e.g., in width) so as to form again a gap having no $SiO_2$ mask. Additionally, at the directional coupler 103, all of the $SiO_2$ masks between the two double hetero mesas 601 are removed as shown in FIG. 6(C).

Figure 6D:
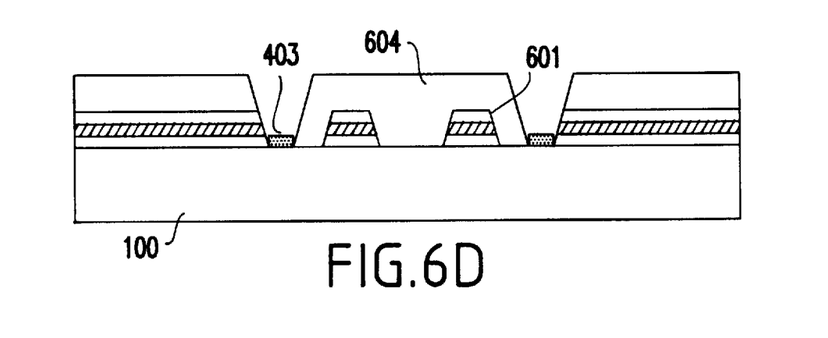
Figure 7D:
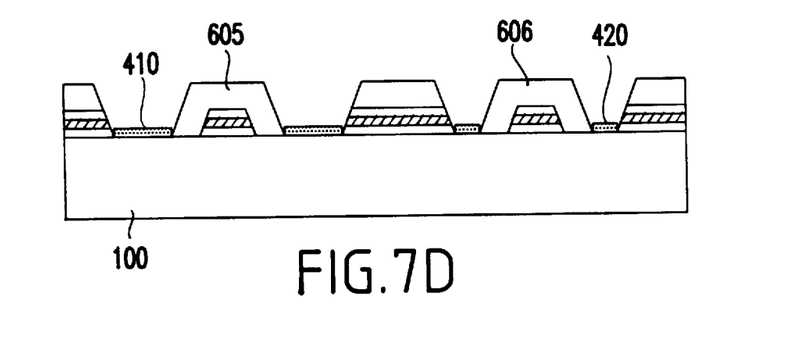

After this operation, as shown in FIGS. 6(D) and 7(D), embedding layers 604, 605 and 606, preferably formed of InP, are formed at the gap through the selective MOVPE growth. Mesa height of each of the InP embedding layers 604, 605 and 606 is preferably about 2 μm. However, these layers may have any height within a range of 1.5 to 3 μm. Further, the embedding layers have a width of 4 μm.

Lastly, after the $SiO_2$ mask is removed through etching or the like, the InP substrate 100 is polished, an element end facet is formed by cleaving. Then, an anti-reflection coating layer, preferably formed of SiON or the like, is deposited at the end facet so as to complete the manufacturing of the element shown in FIG. 3. It is noted that more than one anti-reflection layer may be deposited depending upon the designer's requirements and constraints.

Figure 9:
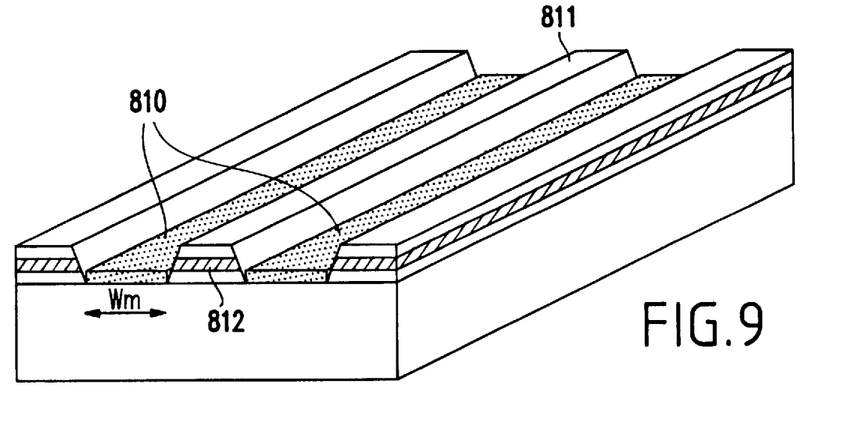
FIG. 9 is a perspective view illustrating a principle of a bandgap energy control caused by a selective metal-organic vapor phase epitaxial (MOVPE) process growth.

As shown in FIG. 9, when either InGaAsP or InGaAs is subjected to selective crystal growth with a MOVPE process at a gap having a width of several μm held by a pair of striped dielectric masks 810, wavelength bandgaps in the growth layer differ in reference to a mask width.

Figure 10A:
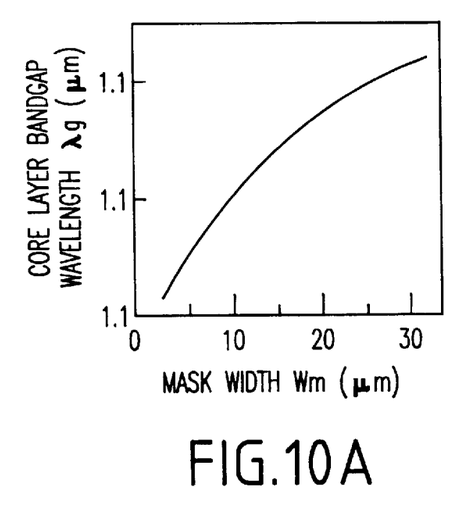
FIGS. 10(A) and 10(B) are views illustrating the relationship between a mask width Wm and a wavelength composition λg of a selectively grown bulk layer (e.g., an InGaAsP bulk layer) and a multiple quantum well layer.

FIG. 10(a) shows a relationship between a mask width Wm and a wavelength bandgap λg of the growth layer when a selectively grown crystal layer is an InGaAsP bulk layer. As the width Wm of the $SiO_2$ mask increases, a composition ratio of In is increased and a bandgap wavelength of the bulk InGaAsP layer is elongated.

As apparent from FIG. 10(a), when the width Wm of the $SiO_2$ mask is changed from 5 μm to 30 μm, the bandgap wavelength may be changed from 1.15 μm to 1.3 μm. This means that regions having different bandgap wavelengths can be formed through one selective growth step, if the region having a different width Wm of the $SiO_2$ mask is made in advance within the same wafer.

Accordingly, it is possible to form, with one crystal growth, a region having a core layer with a transparent (low loss) bandgap wavelength of 1.15 μm with respect to both incident light wavelengths of 1.3 μm and 1.55 μm and another region having a transparent core layer with a bandgap wavelength of 1.3 μm only with respect to the incident light wavelength 1.55 μm.

Figure 10B:
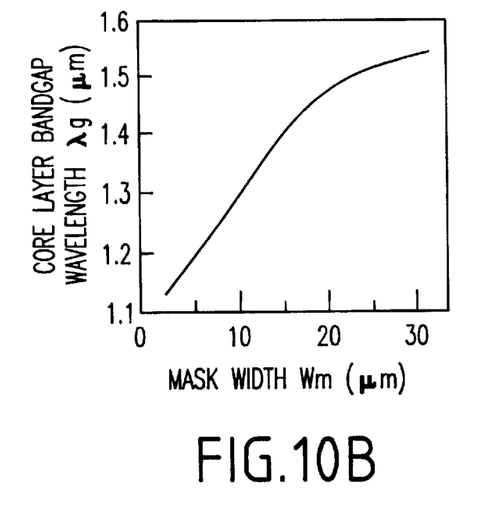

Additionally, when the core layer is a multiple quantum well (MQW) structure, increasing the composition ratio of In as the mask width Wm is widened, and obtaining a fast growth speed as the mask width Wm is widened, may act cooperatively. For example, as shown in FIG. 10(b), dependability of mask width of the bandgap wavelength of the growth layer is further increased. If the MQW structure is applied, the bandgap wavelength may be changed from 1.15 μm to 1.55 μm within the same wafer.

In the present invention, the light waveguide 210 having a longer bandgap wavelength (substantially 1.3 μm) than that of the core layer in another region is connected to the output side of the long wavelength signal at the rear stage of the directional coupler 103. That is, the core layer bandgap wavelength in another region is 1.15 μm, although the core layer with λg=1.3 μm is totally formed together with another core layer of 1.15 μm bandgap through the selective MOVPE growth.

As a result of this structure, it is unnecessary to form a region having a different bandgap wavelength through repetitive operations of etching and crystal growth. Thus, the manufacturing of the element has relatively few steps and can be substantially simplified, as compared to the conventional methods. Accordingly, a manufacturing yield of the element is substantially improved.

Further, when the semiconductor light wavelength filtering circuit is manufactured as above, the core is made continuous at a connection between the directional coupler 103 and the light waveguide 210 having a λg=1.3 μm, and a substantially 100% coupling efficiency can be attained therebetween (e.g., between the directional coupler 103 and the light waveguide 210). Accordingly, substantially no loss occurs at the connection. Further, the entire element has a low propagation loss, and reflected light not required at the connection (and its attendant problems) can be reduced.

Third Embodiment

Hereinafter, a third preferred embodiment of the semiconductor light wavelength filtering circuit according to the present invention will be described with reference to FIG. 8.

In the third preferred embodiment, a semiconductor light wavelength filtering circuit is provided, in which the output waveguide, at an output side of the long wavelength signal, is linear similarly to that of the first preferred embodiment of FIG. 1. As a result, radiation loss is prevented (or at least minimized), and a bandgap wavelength of the output waveguide, at the output side of the long wavelength signal, is elongated to improve a crosstalk characteristic. For example, the crosstalk characteristic may be improved by as much as 10 dB over the first embodiment (the third embodiment has substantially the same crosstalk as the second embodiment; that is, the second embodiment is improved by 10 dB over the first embodiment as well). As mentioned above, in the first embodiment, the longer wavelength is at 13 dB, but improvement is shown at the short side as compared to the conventional circuit.

In the third preferred embodiment, the core layer bandgap wavelength in the output waveguide at the output side of the long wavelength signal, is elongated. Additionally, the output waveguide is formed to have a linear shape differing from that of the second preferred embodiment. In FIG. 8, a linear light waveguide 710 having a longer bandgap wavelength of 1.3 μm than that of another region, is connected to the rear stage of the directional coupler 103. Specifically, the waveguide 710 is connected to the directional coupler 103 at the output side of the long wavelength signal (e.g., the 1.55 μm side).

That is, the bandgap wavelength of the core layer is preferably 1.15 μm at any of the input light waveguide 101, the light waveguide of the directional coupler 103 and the curved output light waveguide 120 at the rear stage of the directional coupler 103 where the short wavelength signal (1.3 μm side) is outputted.

In contrast, the bandgap wavelength of the core layer is preferably 1.3 μm longer than that of another region only in the output waveguide 710 at the output side of the long wavelength signal (1.55 μm side).

Additionally, in the third preferred embodiment, the output waveguide 710, at the output side of the long wavelength signal (1.55 μm side), is linear.

Accordingly, substantially no radiation loss occurs at the output waveguide at the 1.55 μm side. Additionally, since the bandgap wavelength of the core layer of the output waveguide 710, at the 1.55 μm side, is 1.3 μm, the short wavelength crosstalk signal with a 1.3 μm wavelength is absorbed, and the crosstalk characteristic is also improved similarly to that of the second preferred embodiment.

If a radius of curvature of the curved output light waveguide 120, at an output side of the short wavelength signal, is low (e.g., 2–4 mm) such that the radiation loss is generated for the relatively long wavelength signal light (e.g., the 1.55 μm light signal) but the radiation loss is not generated for the relatively short wavelength signal light (e.g., the 1.3 μm light signal), the crosstalk component (e.g., the long wavelength signal component) for an output side of the short wavelength signal (e.g., the output end 102b) is removed by radiation. Accordingly, even in the third preferred embodiment, the cross-talk is reduced in the relatively long wavelength side output waveguide and the relatively short wavelength side output waveguide similarly to that of the second preferred embodiment.

Additionally, in the third preferred embodiment, the incident light waveguide 101 also is linear similarly to that of the first and second preferred embodiments. Although the relatively long wavelength signal light is necessarily incident to the incident light waveguide, the incident light waveguide also is linear so as to prevent (or at least minimize) a radiation loss at the incident side.

Figure 8:
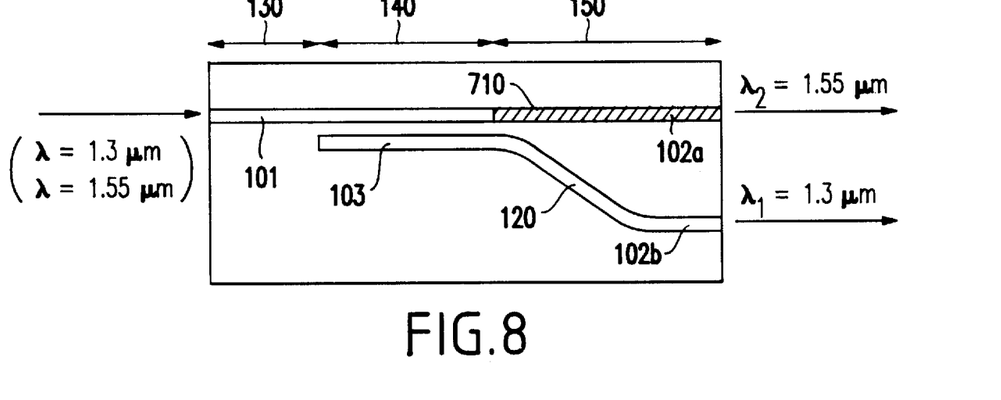
FIG. 8 illustrates a structure of the directional coupler-type light wavelength filtering circuit of the third preferred embodiment of the semiconductor light wavelength filtering circuit according to the present invention.

For brevity, since a shape of the light waveguide with λg=1.3 μm is merely changed from being curved to being linear in FIG. 3, a description of the practical structure of the third preferred embodiment of FIG. 8 will be omitted.

Additionally, for brevity, the manufacturing method of the third preferred embodiment will not be described since such a method is almost identical to that of the second preferred embodiment. The only exception is that the shape of the SiO$_2$ mask when the double hetero structure is selectively grown is made different at the output waveguide at an output side of the long wavelength signal (e.g., the 1.55 μm side).

In the third preferred embodiment, a linear light waveguide 710, in which the bandgap wavelength of the core layer of approximately 1.3 μm is longer than that of the core layer in another region, is connected to an output side of the relatively long wavelength signal at the rear stage of the directional coupler 103.

That is, although the core layer bandgap wavelength at the light waveguide 710 with λg=1.3 μm is set to approximately 1.3 μm whereas the core layer bandgap wavelength in another region is 1.15 μm, the core layer with λg=1.3 μm is formed together with the core layer of another 1.15 μm through the selective MOVPE growth.

Thus, it is unnecessary to form the region having a different bandgap wavelength through repetition of etching and crystal growth, and the manufacturing steps are substantially simplified. Accordingly, the manufacturing yield of the element is also substantially improved.

Additionally, with the semiconductor light wavelength filtering circuit manufactured according to the present invention, the core is made continuous at a connection portion between the directional coupler 103 and the light waveguide 210 having λg=1.3 μm. Hence, a substantially full coupling efficiency can be attained between the directional coupler and the waveguide 210. Accordingly, since substantially no loss occurs at the connection portion, not only is the transmission loss of the entire element low, but also reflected returning light not required at the connection (and its attendant problems) can be reduced.

According to the third preferred embodiment of the present invention, the bandgap wavelength of the output waveguide at the output side of the long wavelength signal is elongated and has a linear shape, thereby resulting in the semiconductor light wavelength filtering circuit having substantially no radiation loss and having a superior cross-talk characteristic which can be produced easily and with superior yield.

As described above, in the present invention, a transparent passive waveguide with respect to all the incident wavelengths and a waveguide having a refractive index which is sufficiently high with respect to a long wavelength side transmission light and is transparent only in respect to the long wavelength side signal, can be formed completely with one crystal growth process.

Accordingly, the present invention provides a manufacturing method in which the number of steps is less than that of a manufacturing method repeating etching and crystal growth steps, and which is simpler and has a better manufacturing yield.

Applying the manufacturing method of the present invention enables a light coupling efficiency between the waveguides with different bandgap wavelengths to become approximately 100% due to the presence of a continuous core layer, resulting in the entire element having low loss and a reflected returning light generated between the waveguides with different bandgap wavelength having little influence on the element characteristics.

As described above, applying the manufacturing method of the present invention enables a configuration of a wavelength filtering circuit without any radiation loss of the long wavelength side signal to be provided when an output signal light is separated after it is separated in wavelength with the light wavelength discriminating element.

Additionally, a manufacturing method is provided which is simple and which has superior yield as compared to a method of monolithically integrating waveguides of different bandgap wavelengths so as to reduce loss caused by radiation of the relatively long wavelength side signal.

While the invention has been described in terms of several preferred embodiments, those skilled in the art will recognize that the invention can be practiced with modification within the spirit and scope of the appended claims. Thus, each of the preferred embodiments of the present invention described above is not limited to this form, but the present invention may be applied in other various embodiments.

Specifically, although only the semiconductor light wavelength filtering circuit having the InP system directional coupler-type light wavelength discriminating element as a basic element thereof has been described, the present invention may use other material systems such as an InAlAs system. Additionally, the configuration shown in the first preferred embodiment is not limited to other semiconductor materials, but the present invention may also be applied to light waveguides such as $LiNbO_3$ or $SiO_2$.

Additionally, as a basic circuit system for the light wavelength discriminating element, the directional coupler-type is not the only type which can be used. Indeed, the present invention can be applied to all types of waveguide light wavelength discriminating elements such as a Mach-Zehnder-type, waveguide grating-type or a type having a star coupler combined with an arrayed waveguide grating (AWG).

In the preferred embodiments above, although only an example where two output waveguides are provided (e.g., the number of wavelength multiplexers is 2) has been described, the number of output waveguides is not limited thereto, but any number of output waveguides may be employed. In case of more output waveguides, the core layer bandgap wavelength in each of the output light waveguides would be adjusted such that no radiation loss is produced in each of the light waveguides.

With the manufacturing method of the present invention, many regions having different bandgap wavelengths are easily formed by simply changing the width of the selective growth $SiO_2$ mask.

As described above, according to the present invention, a semiconductor light wavelength filtering circuit may be provided in which the output waveguides are integrated so as to prevent (or at least minimize) any radiation loss even against the long wavelength side signal.

Additionally, in the semiconductor light wavelength filtering circuit in which a bandgap wavelength of the core layer in the long wavelength side output waveguide is elongated more than that of the core layer in another region to reduce the radiation loss and the crosstalk, the output waveguide region having a relatively long bandgap wavelength and another region having a relatively short bandgap wavelength are formed completely through a selective MOVPE process.

Hence, a region having a different bandgap wavelength need not be formed through repetitive etching and crystal growth steps, and thus the manufacturing steps are substantially simplified and minimized. Accordingly, the light wavelength filtering circuit having reduced radiation loss and an improved cross-talk characteristic may be produced easily.

Additionally, when the semiconductor light wavelength filtering circuit is manufactured with the present manufacturing method, the core layer may become continuous at the connection portion between the directional coupler and the long wavelength signal output light waveguide, and a substantially 100% coupling efficiency can be achieved at the connection portion. Accordingly, substantially no loss is generated at the connection portion, and the entire element has a low transmission loss. Further, the adverse affects of reflection returning light not required at the connecting part may also be reduced.

Additionally, the system of the present invention can be integrated with diode lasers and detectors similar to those described in Japanese Laid-Open Patent Application Nos. 62-121409 and 5-173033.

Furthermore, a plurality of wavelengths could be employed and a combination of input/output start couplers could be employed with arrayed waveguide gratings (AWGs) (e.g., similar to those employed in the conventional system disclosed by Dragone mentioned above) connecting them together.

Having thus described our invention, what we claim as new and desire to secure by Letters Patent is as follows:

1. A light wavelength filtering circuit, comprising:
    an input light waveguide to which a wavelength-multiplexed light signal is incident;
    a light wavelength discriminating element, connected to the input light waveguide, for separating said wavelength-multiplexed light signal for wavelengths present therein, to form wavelength light signals; and
    a plurality of output light waveguides, connected to the light wavelength discriminating element, for spatially separating each of the wavelength light signals separated by the light wavelength discriminating element,
    wherein an output light waveguide of said output light waveguides for outputting a first wavelength signal light comprises a linear light waveguide and an output waveguide for outputting a second wavelength signal light comprises a curved light waveguide, said first wavelength light signal having a wavelength greater than that of said second wavelength light signal, said curved light waveguide having a radius of curvature for causing a radiation loss of said first wavelength light signal and for substantially preventing radiation loss of said second wavelength light signal.

2. A light wavelength filtering circuit according to claim 1, wherein said linear light waveguide has a first bandgap wavelength and said output waveguide has said first bandgap wavelength.

3. A light wavelength filtering circuit according to claim 1, wherein said linear light waveguide has a first bandgap wavelength and said curved output waveguide has a second bandgap wavelength different than said first bandgap wavelength.

4. A light wavelength filtering circuit according to claim 3, wherein said first bandgap wavelength has a wavelength greater than that of said second bandgap wavelength.

5. A light wavelength filtering circuit as set forth in claim 1, wherein said light wavelength discriminating element comprises one of an InP, InAlAs, LiNbO$_3$, and SiO$_2$ system directional coupler-type light wavelength discriminating element.

6. A light wavelength filtering circuit, comprising:

an input light waveguide to which a wavelength-multiplexed light signal is incident;

a light wavelength discriminating element, connected to the input light waveguide, for separating said wavelength-multiplexed light signal for wavelengths present therein, to form wavelength light signals; and a plurality of output light waveguides, connected to the light wavelength discriminating element, for spatially separating each of the wavelength light signals separated by the light wavelength discriminating element, wherein a first output light waveguide of said plurality of output light waveguides is for outputting a first wavelength signal and includes a core layer, a bandgap wavelength of said core layer having a longer wavelength than a core layer bandgap wavelength of an output light waveguide of said plurality of output light waveguides, an input light waveguide, and a light waveguide of said light wavelength discriminating element.

7. A light wavelength filtering circuit as set forth in claim 6, wherein said first output light waveguide comprises a curved waveguide.

8. A light wavelength filtering circuit as set forth in claim 6, wherein said first output light waveguide comprises a linear waveguide.

9. A light wavelength filtering circuit as set forth in claim 6, further comprising a second output light waveguide, wherein said first output light waveguide and said second output light waveguide each comprise a curved waveguide.

10. A light wavelength filtering circuit as set forth in claim 6, further comprising a second output light waveguide, wherein said first output light waveguide comprises a linear waveguide and said second output light waveguide comprises a curved waveguide.

11. A light wavelength filtering circuit as set forth in claim 6, wherein said light wavelength discriminating element comprises a directional coupler-type light wavelength discriminating element.

12. A light wavelength filtering circuit as set forth in claim 6, wherein said light wavelength discriminating element comprises one of an InP and InAlAs system directional coupler-type light wavelength discriminating element.

13. A light wavelength filtering circuit manufactured by a process comprising steps of:

forming a mask having a pattern of gap corresponding to core layer patterns in an input light waveguide, a waveguide-type light wavelength discriminating element and an output light waveguide on a substrate;

depositing sequentially a buffer layer, a core layer and a cladding layer on the gap of said mask to form mesa stripes containing the core layer with the input light waveguide, the waveguide-type light wavelength discriminating element and the output light waveguide;

widening a width of the gap of said mask; and depositing an embedding layer on said widened gap and on the mesa stripes containing said core layer, wherein a width of the dielectric mask of the output light waveguide for use in outputting the first wavelength side signal light in said output light waveguide is greater than a width of the dielectric mask in another region.

14. A light wavelength filtering circuit according to claim 13, said process further comprising a step of removing said mask, wherein said step of forming a mask comprises a step of forming a selective growth dielectric mask, and wherein said substrate comprises a semiconductor substrate, and wherein said step of depositing sequentially comprises a step of depositing sequentially a buffer layer, a core layer and a cladding layer on the gap of said mask to form mesa stripes containing the core layer simultaneously with the input light waveguide, the waveguide-type light wavelength discriminating element and the output light waveguide.

* * * * *